United States Patent [19]
Carpenter et al.

[11] Patent Number: 5,110,771
[45] Date of Patent: May 5, 1992

[54] METHOD OF FORMING A PRECRACKED FIBER COATING FOR TOUGHENING CERAMIC FIBER-MATRIX COMPOSITES

[75] Inventors: Harry W. Carpenter, Northridge; James W. Bohlen, Fountain Valley, both of Calif.

[73] Assignee: Northrop Corporation, Hawthorne, Calif.

[21] Appl. No.: 669,132

[22] Filed: Mar. 13, 1991

[51] Int. Cl.⁵ .............................................. C04B 35/76
[52] U.S. Cl. .................................... 501/95; 428/366; 428/370; 428/378
[58] Field of Search ................. 501/95; 428/325, 330, 428/331, 366, 370, 372, 378, 379, 381, 384, 388

[56] References Cited

U.S. PATENT DOCUMENTS

| | | | |
|---|---|---|---|
| 4,218,253 | 8/1980 | Dworak et al. | 106/43 |
| 4,298,385 | 11/1981 | Claussen et al. | 501/105 |
| 4,657,877 | 6/1987 | Becher et al. | 501/89 |
| 4,749,667 | 6/1988 | Jun et al. | 501/89 |
| 4,774,209 | 9/1988 | Gadkaree et al. | 501/89 |
| 4,855,262 | 8/1989 | Richon et al. | 501/92 |
| 4,885,199 | 12/1989 | Corbin et al. | 428/113 |
| 4,916,092 | 4/1990 | Tiers et al. | 501/89 |
| 4,920,838 | 5/1990 | Brandt et al. | 82/1.11 |
| 4,935,296 | 6/1990 | Stevens et al. | 428/288 |
| 4,946,807 | 8/1990 | Okuno et al. | 501/89 |

FOREIGN PATENT DOCUMENTS

54-70333 6/1979 Japan.

*Primary Examiner*—William R. Dixon, Jr.
*Assistant Examiner*—Chris Gallo
*Attorney, Agent, or Firm*—Terry J. Anderson; Robert B. Block; Karl J. Hoch, Jr.

[57] ABSTRACT

A method of producing a ceramic fiber/ceramic matrix composite having a precracked fiber coating includes depositing a metal coating or a metal nitride or metal carbide coating on each ceramic fiber in a preform of fibers, infiltrating the fiber preform with a ceramic matrix to form a ceramic fiber/ceramic matrix composite, after the formation of the composite is complete, oxidizing the coating so as to change the coating to an oxide thereof. This process forms microcracks throughout the oxidized coating because of the mismatch in characteristics between the precursor layer and the final oxidized layer. An alternative method of producing a ceramic fiber/ceramic matrix composite having a precracked fiber coating includes depositing an oxidation resistant oxide, carbide or nitride which undergoes a destructive phase transformation after the coating and matrix infiltration processes are complete by the use of thermal cycling. This process forms microcracks throughout or around the coating because of the volume change associated with the phase transformation.

14 Claims, 1 Drawing Sheet

METHOD OF FORMING A PRECRACKED FIBER COATING FOR TOUGHENING CERAMIC FIBER-MATRIX COMPOSITES

BACKGROUND OF THE INVENTION

1. Technical Field

The invention is related to methods for forming ceramic matrix composites having ceramic fibers coated with a toughening layer which facilitates fiber de-bonding and pull-out in the wake of a crack in the matrix.

2. Background Art

Fiber reinforced ceramic matrix composites comprise a weave of ceramic fibers embedded in a ceramic matrix. One way of improving the mechanical properties of such a composition is to provide a coating over the fibers which is stable and resistant to oxidation and which promotes fiber de-bonding at the tip of an advancing crack and fiber bridging and eventually pull-out in the wake of an advancing crack in the composite. This feature enhances the toughness, strength and strain to failure of the composite because the fibers remain mostly immune to advancing cracks in the matrix. The history of development of this technique is described in U.S. Pat. No. 4,885,199 to Corbin et al.

For certain applications, the ceramic matrix composite must be stable at temperatures above 2200 degrees F. in an oxidizing environment. Well-known fiber coatings such as carbon and boron nitride are not stable under such conditions. Any material to be substituted for a fiber coating in place of the carbon or boron nitride must be both resistant to oxidation and must possess sufficient strength to transfer loads from the matrix to the fiber while having a low shear strength to promote debonding between the fiber and the matrix in the presence of an advancing crack. Furthermore, the coating must be easy to apply to macrofibers, fiber tows and to a weave of ceramic fibers during manufacturing.

U.S. Pat. No. 4,946,807 to Okuno et al. discloses a SiC whisker composite in which zirconia is added as a particle, not as a coating on continuous fibers. U.S. Pat. No. 4,657,877 to Beecher et al. discloses SiC whiskers in mullite or alumina toughened by adding zirconia particles, in which the zirconia is not a fiber coating. U.S. Pat. No. 4,749,667 to Jun et al. discloses SiC whiskers in a composite with alumina containing particulate zirconia, in which the zirconia is not a coating on a continuous fiber. U.S. Pat. No. 4,920,838 to Brandt et al. discloses a ceramic cutting tool in which zirconia is present in particulate form, not as a coating on a continuous fiber. U.S. Pat. No. 4,774,209 to Gadkaree et al. discloses whisker reinforced zirconia-mullite ceramics in which zirconia is present as dispersed particles and not a coating on a continuous fiber. U.S. Pat. No. 4,218,253 to Dworak et al. discloses improving ductility of sintered alumina by including particulate zirconia, and has nothing to do with using zirconia as a fiber coating. U.S. Pat. No. 4,298,385 to Claussen et al. discloses zirconia present in particulate form in a sintered ceramic matrix such as alumina to cause fractures in the matrix, and has nothing to do with using zirconia as a coating on continuous fibers or a fiber reinforced ceramic matrix. Japanese Patent No. 54-70333 discloses surface coating for inorganic fibers to produce cement products using added zirconia.

The prior art as described in U.S. Pat. No. 4,885,199 referenced above typically relied upon the characteristics of the inherently weak shear strength of carbon and boron nitride coatings to achieve desired characteristics, such as toughening. For applications in the high temperature oxidizing environments described above, the intrinsic properties of the coating composition would have to provide all of the necessary features, including fiber de-bonding and pull-out as well as imperviousness to oxidation and high temperatures. The problem with this approach is that it is very difficult to select the best fiber coating material for a given ceramic fiber so as to optimize all of the foregoing features in the same coating material composition.

Thus, one object of the present invention is to depart from the prior art approach of finding a coating composition which provides all of the necessary features, and instead find a mechanical approach in which all, or at least some, of the desired features (such as fiber de-bonding and pull-out in the wake of an advancing crack in the matrix) are realized through the mechanical features of the coating and coating/fiber interface, as distinguished from the inherent features of the composition. Such a mechanical approach has many advantages and, in most cases, allows greater choice in selecting the materials for use in the coating. For example, the materials can be chosen to meet only the requirement of resistance to oxidation and stability at high temperatures, while the remaining requirements (e.g., fiber de-bonding and pull-out) are met by mechanical features in the coating or coating/fiber interface. In fact, the same composition as the fiber and/or the matrix would be a candidate for the coating. This advantage will become clear in the description of the invention which follows the conclusion of this description of the background art.

In the present invention, the mechanical feature which promotes the requisite tendencies (e.g., fiber de-bonding and pull-out in the wake of an advancing crack in the fiber/matrix composite) is the presence of pre-formed cracks in the fiber coating. A method of forming microcracks in a ceramic matrix is disclosed in the background discussion in U.S. Pat. No. 4,732,877 to Olson et al., which teaches the addition of zirconia to the ceramic matrix and heating the zirconia through its tetragonal phase change temperature to form microcracks in the ceramic matix. Such microcracks enhance the strength of the ceramic matrix by diffusing advancing cracks. One problem is that characteristics of the material produced by this method, such as the thermal expansion coefficient of the fiber coating, are not readily controlled or varied, being determined by the monoclinic-tetragonal phase change of the zirconia. Moreover, the referenced patent to Olson et al. has nothing to do with forming microcracks in a thin coating surrounding ceramic fibers immersed in a ceramic matrix. Instead, Olson et al. teach a method for maximizing the density of a zirconia diffusion barrier coating formed on the ceramic fibers prior to their immersion at very high temperatures in a ceramic matrix. There appear to be no known methods for forming a pre-cracked coating on a ceramic fiber in a ceramic matrix.

Accordingly, it is an object of the invention to provide methods ideally suited for forming a pre-cracked coating on a ceramic fiber in a ceramic matrix.

It is a related object of the invention to provide a method of forming a pre-cracked metal oxide or non-oxide coating around a ceramic fiber in which the oxide or non-oxide is formed or transformed in situ after the fiber has been embedded in a ceramic matrix.

It is another object of the invention to form a precracked coating on a ceramic fiber in a ceramic matrix whose properties are selectively determined during processing.

SUMMARY OF THE INVENTION

A metal oxide coating interlaced with microcracks is formed around each ceramic fiber in a ceramic fiber/matrix composite structure by depositing a metal coating on the fibers, embedding the fibers in the matrix and then oxidizing the metal coating in situ so that the coating is transformed from a metal to a metal oxide in such manner as to form the requisite microcracks in the metal oxide material. In the same manner but by controlling the atmosphere, an in situ coating of a nitride, carbide or boride could also be formed directly from the metal or by conversion of the oxide. Alternatively, an oxide could be formed in situ by conversion of a non-oxide that was formed during embedding of the fibers in the matrix. The advantage of the invention is that it is ideally suited for forming microcracks in or around the fiber coating. In contrast, the prior art methods of forming microcracks discussed above were directed toward forming microcracks in a ceramic matrix which did not necessarily have ceramic fibers immersed therein. Thus, the invention solves the problem of providing a method ideally suited for forming microcracks in or around the fiber coating.

The invention provides advantages not enjoyed in prior methods. These advantages are principally that the following parameters may be tailored to fit specific requirements: (1) the thickness of the precursor metal coating on the fibers; (2) the relationship of the thermal expansion coefficients of the precursor coating on the fibers, the metal oxide (or non-oxide) formed in situ, the ceramic fiber and the ceramic matrix; and (3) the disparity between the densities of the metal coating and the metal oxide (or non-oxide) coating.

In one preferred embodiment of the invention, the precursor metal coating is tantalum. The tantalum coating is deposited on the ceramic fibers by painting or dipping the fibers in a metallo-organic solution of tantalum prior to the immersion of the fibers in the ceramic matrix. After the organic solvent has evaporated from the solution deposited on the fibers to leave a pure tantalum coating on the fibers, the fibers are immersed in a ceramic matrix to form a fiber/matrix ceramic composite. Finally, the composite is heated in an oxidizing environment so as to oxidize in situ the tantalum coating on each fiber. The resulting coating is weak and microcracked due to the disparity in densities and lattice structure and thermal expansion coefficients of the precursor metal and the in situ oxide (i.e., tantalum and tantalum oxide).

In another embodiment of the invention, the precursor metal coating is zirconium. The zirconium coating is deposited on the ceramic fibers by painting or dipping the fibers in a metallo-organic solution of zirconium prior to the immersion of the fibers in the ceramic matrix. After the organic solvent has evaporated from the solution deposited on the fibers to leave a pure zirconium coating on the fibers, the fibers are immersed in a ceramic matrix to form a fiber/ceramic composite. Finally, the composite is heated in an oxidizing environment so as to oxidize in situ the zirconium coating on each fiber. This creates microcracks in the coating due to the disparity in densities of zirconium and zirconia and, in addition, due to the phase transition of zirconia from the monoclinic to the tetragonal structure upon the introduction of strain and/or thermal energy. In accordance with this embodiment, any suitable composition, oxide, carbide, silicide or aluminide that undergoes a phase transformation accompanied by a large volume change that results in fracture of the compound could be used in place of zirconium oxide. The coating of the suitable compound is formed by deposition onto the fiber, immersing the coated fibers in the matrix at temperatures above or below the transition temperature for the compound, and cycling the composite through the transition temperature to precrack the coating.

In another embodiment, any suitable composition, oxide, carbide, nitride, silicide or aluminide, with a substantially higher or lower thermal expansion coefficient than that of the fiber may be used as a fiber coating, so long as the matrix infiltration can be completed without thermally cycling the coating. The coating of the suitable compound is formed by deposition onto the fiber followed by embedding the coated fiber in the matrix at temperatures similar to that used for depositing the coating without any significant temperature changes. One example would be chemical vapor deposition of the coating and the matrix sequentially without cooling the heated fibers until the composite is completed, whence the stresses from differential expansion fracture the coating.

In an alternative embodiment of the invention, the fiber coating is formed by depositing a metal nitride or a metal carbide coating on the fibers, infiltrating the fibers with ceramic matrix and then oxidizing the metal nitride or metal carbide coating. The ceramic composition of the fibers and the matrix affects the choice of the metal in the nitride or carbide coating on the fibers. Specifically, the metal in the carbide or nitride coating on the fibers must be such that the process of oxidizing the carbide or nitride coating on the fiber is not destructive to the ceramic fiber or the ceramic matrix. For example, if the ceramic fibers are silicon carbide and the ceramic matrix is also silicon carbide, then the preferred material for the precursor coating on the fibers is tantalum nitride.

BRIEF DESCRIPTION OF THE DRAWING

The invention is described below in detail with reference to the accompanying drawing, which is a cross-sectional view of a ceramic fiber/ceramic matrix composite formed in accordance with the present invention.

DETAILED DESCRIPTION OF THE INVENTION

Figure 1:
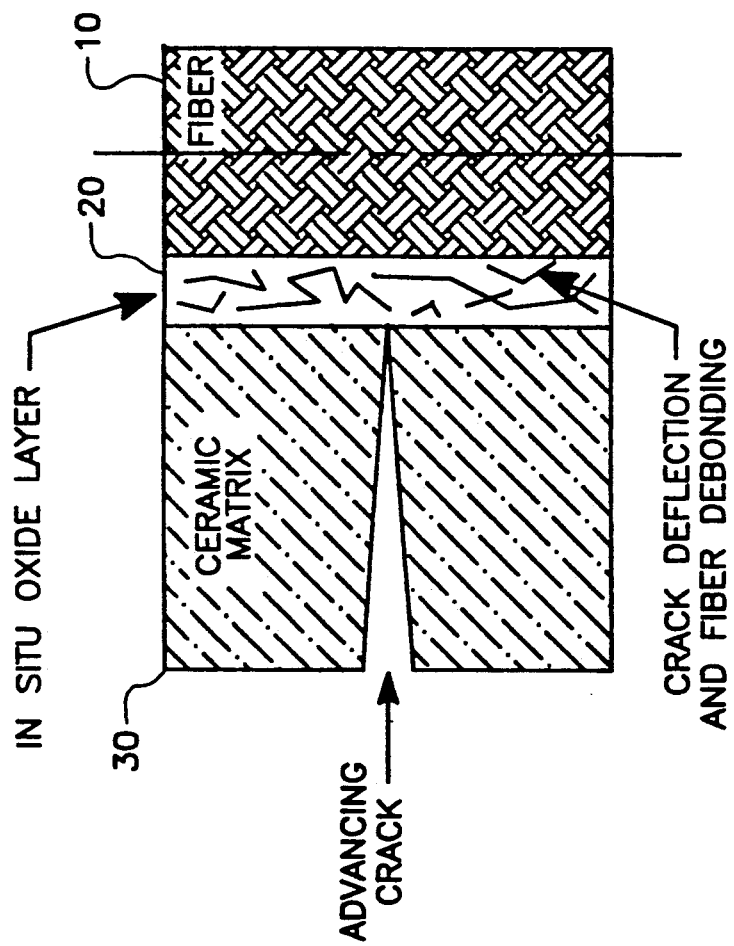

Referring to the accompanying drawing, a ceramic fiber 10 such as a silicon nitride fiber for example, is painted with a coating 20 of a metallo-organic solution of tantalum. The ceramic fiber 10 may be one of many fibers in a fiber weave. The organic solvent is allowed to evaporate from the coating 20 and the organic compound is pyrolyzed, so that the coating 20 changes to a pure tantalum coating. The weave including the fiber 10 with the tantalum coating 20 is then infiltrated with a ceramic matrix 30 in a inert or reducing environment to produce a ceramic fiber/ceramic matrix composite, using conventional techniques well-known in the art. The inert environment prevents the tantalum coating 20 on the fiber 10 from oxidizing prior to the infiltration of the fiber weave by the ceramic matrix 30. After the formation of the ceramic fiber/ceramic matrix composite is complete, the composite is placed in an oxidizing environment and is heated to a temperature sufficiently high to oxidize the tantalum coating 20. The coating 20 is thus transformed in situ in the fiber/matrix composite to a tantalum pentoxide coating. The oxidized coating has a density which is less than the density of its metal (tantalum) precursor. This mismatch is accompanied by the formation of microcracks in the oxide grain structure of the oxidized coating 20 or in the immediate surrounding ceramic matrix.

Metals other than tantalum may be selected. However, the oxide composition or density of the coating 20 as well as its thickness must be carefully selected to avoid excess compressive stresses and the possibility of sintering during use, which could nullify the toughening mechanism of the microcracks. Oxides such as tantalum oxide that form on a precursor metal with a mismatch in density, as in the present invention, are typically nonadherent, weak and therefore nonprotective of the underlying material. The compressed oxide grains will transmit loads between the matrix and the fiber, but they will also facilitate fiber de-bonding and pull-out in the presence of an advancing crack. Compressive stresses may be reduced or avoided altogether by creating porosity in or around the metal coating. By doing this, the in situ oxide has space to grow into. The metal in the fiber coating 20 may be selected as one of the group including Zr, Ta, Nb, Ti, Sn and Al. The choice may depend upon the temperature required to perform the ceramic matrix/fiber infiltration process.

In another aspect of the invention, the metal composition in the fiber coating 20 is graded between its interfaces with the ceramic fiber 10 and the ceramic matrix 30. Thus, for example, the surface of the coating facing the fiber 10 may be of pure zirconium, the surface of the coating 20 facing the matrix 30 may be pure tantalum while the middle of the coating is a mixture of zirconium and tantalum. Such a graded coating may be formed by depositing successive layers on the fiber 10 using chemical vapor deposition starting with one metal, gradually mixing in a second metal in greater concentrations in successive layers until the final layers use only the second metal. The oxides formed during the final step of the process will be similarly graded.

In an alternative embodiment of the invention, the coating 20 precursor material comprises a metal nitride or a metal carbide. Thus, a metal nitride or metal carbide is deposited on the fibers, or the metal precursor is deposited and converted to the nitride or carbide during the pyrolyzation process, the fibers are infiltrated with the ceramic matrix and the metal nitride or metal carbide coating on the fibers is then oxidized. If the coating 20 is graded in composition, then the oxidized metal nitride or metal carbide material comprises only a portion of the coating 20, the remainder comprising other materials referred to herein. The ceramic composition of the fiber 10 and the matrix 30 affects the choice of the metal in the nitride or carbide coating 20 on the fiber. Specifically, the metal in the carbide or nitride coating 20 on the fiber 10 must be such that the process of oxidizing the carbide or nitride coating on the fiber 10 is not destructive to the ceramic fiber 10 or the ceramic matrix 30. For example, if the ceramic fiber 10 is silicon carbide and the ceramic matrix 30 is also silicon carbide, then a preferred material for the precursor material of the coating 20 on the fibers 10 is tantalum nitride.

The advantage of the invention is illustrated in the drawing, showing how an advancing crack in the matrix 30, upon reaching the fiber coating 20, is diverted by the microcracks in the coating, causing the fiber coating 20 to fracture and thereby allowing the fiber 10 to debond from the coating 20 and the matrix 30, thus avoiding stress from the advancing crack in the matrix 30 damaging the fiber 10.

While the invention has been described in detail with reference to preferred embodiments thereof, it is understood that variations and modifications may be made without departing from the true spirit and scope of the invention.

What is claimed is:

1. A method of producing a ceramic fiber/ceramic matrix composite having a precracked fiber coating, comprising:
   depositing a precursor oxidizable coating on ceramic fibers;
   infiltrating said fibers with a ceramic matrix to form a ceramic fiber/ceramic matrix composite;
   after the formation of said composite, oxidizing said coating, whereby to form plural microcracks in the oxidized coating.

2. The method of claim 1 wherein the infiltrating step is carried out in an inert environment or in a reducing environment so as to avoid oxidizing the coating prematurely.

3. The method of claim 1 wherein said precursor coating is selected from the group of metals including Zr, Ta, Nb, Ti, Sn and Al or one of the group of metal carbides and metal nitrides.

4. The method of claim 3 wherein the step of depositing the precursor coating comprises depositing successive thin layers beginning with a first material of one of said groups and increasing the concentration of a second material of one of said groups in subsequent ones of said successive layers until the last layers thereof comprise said second material only, whereby to grade the composition of said coating.

5. The method of claim 1 wherein said step of depositing comprises depositing a metallo-organic solution of a metal and allowing an organic solvent to evaporate from said coating and remanents thereof to be pyrolyzed to remove organic compounds.

6. A ceramic fiber/ceramic matrix composite, comprising:
   a preform of ceramic fibers;
   an oxidized coating weakened by microcracks surrounding each of the fibers of said preform; and
   a ceramic matrix infiltrated in the preform of coated fibers.

7. The composite of claim 6 wherein said oxidized coating is formed by the process of oxidizing a coating on said fibers after said fibers have been infiltrated by said ceramic matrix.

8. The composite of claim 7 wherein said preform is initially infiltrated with said matrix in a reducing or inert environment whereby to avoid oxidizing said coating prior to said process of oxidizing.

9. The method of claim 6 wherein said coating is selected from the group of metals including Zr, Ta, Nb, Sn and Al or the group of metal carbides and metal nitrides.

10. The method of claim 6 wherein the coating comprises successive thin layers beginning with a first material of one of said groups and increasing the concentration of a second material of one of said groups in subsequent ones of said successive layers until the last layers thereof comprise said second material only, whereby the composition of said coating is graded.

11. The method of claim 6 wherein said coating is in direct contact with said ceramic matrix as well as being in direct contact with said fibers.

12. A method of producing a ceramic fiber/ceramic matrix composite having a precracked fiber coating characterized by a coating transformation temperature, comprising:

depositing a transformable oxide, nitride or carbide coating on ceramic fibers at a temperature different from the coating transformation temperature;

cycling the composite through said coating transformation temperature whereby to form plural microcracks in the coating.

13. The method of claim 12 wherein said coating comprises zirconia.

14. The method of claim 13 wherein said matrix and fibers comprise alumina.

* * * * *